Nov. 23, 1926.
D. O. BARRETT
1,608,459
AIR STARTING VALVE
Filed Oct. 29, 1925
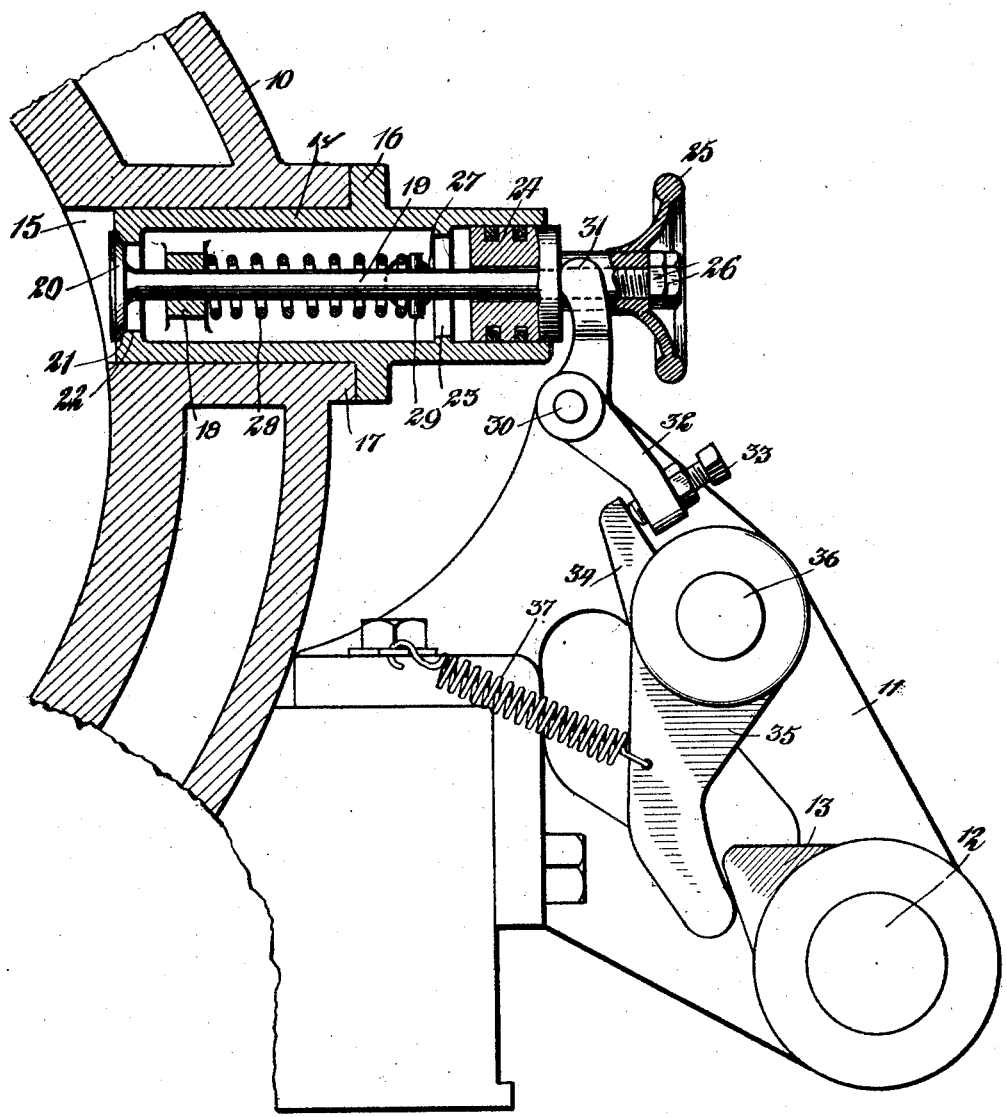
WITNESSES
INVENTOR
D.O. Barrett
BY
ATTORNEYS Patented Nov. 23, 1926.

1,608,459

UNITED STATES PATENT OFFICE.

DWIGHT O. BARRETT, OF SPRINGFIELD, OHIO.

AIR STARTING VALVE.

Application filed October 29, 1925. Serial No. 65,631.

The starting valve of the present invention while suitable for practically all types of internal combustion engines, is primarily adapted for use in connection with engines of the Diesel or cold starting type.

An object of the invention is to provide a valve of this character which will be substantially automatic in operation, so that the operator of an engine need merely turn on the compressed air to effect starting, and turn it off to throw the valve out of operation after starting.

More specific objects of the invention are to provide a valve of extremely simple, practical construction, which lends itself to economical manufacture, to ready installation on any well known type of engine, and to convenient operation by the lay-shaft of such engine, although other operating mechanism might be utilized.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawing which is a view partly in section and partly in elevation, showing a fragment of an engine with my improved valve in applied position.

10 represents the cylinder head of an engine. 11 is one of the brackets for supporting the lay-shaft 12 carrying the usual set of valve operating cams, one of which is indicated at 13 for operating the starting valve.

The valve casing 14 is of substantially cylindrical shape, bolted or otherwise secured in an opening 15 of the cylinder head which communicates with the combustion space of the cylinder. Casing 14 may be provided with an external flange 16 abutting a boss 17 on the exterior of the cylinder. It is also formed with an internal bearing sleeve 18 guiding the sliding movement of a valve stem 19 carrying a valve 20, coacting with a seat 21, formed on an inwardly turned lip 22 at the inner end of the cylindrical valve casing.

Near its outer end the casing is formed with an internal annular flange 23 limiting the inward sliding movement of a piston 24 which slides freely within the casing and upon the valve stem 19. The outward sliding movement of this piston is limited by a hand wheel or equivalent device 25 screwed on to the outer threaded end of the valve stem. A pair of lock nuts 26 predetermine the extent to which the hand wheel may be screwed outwardly on the stem.

A port 27 disposed between the flange 23 and bearing sleeve 18 permits the entrance of compressed air into the valve casing, such air being derived from any suitable source and remotely manually controlled in any approved manner. A spring 28 encircling the valve stem 19 bears at one end against the sleeve 18 and at its other end against a cross pin 29 carried by the stem, or if desired directly against the piston, said spring tending to maintain the valve seated.

Pivoted at 30 is a lever which includes a bifurcated end 31 straddling the valve stem 19 and adapted to engage the piston 24. The other end 32 of this lever carries an adjustable set screw 33 engaged by the arm 34 of a lever 35 fulcrumed at 36 on a stud projecting from the bracket 11. Lever 35 is engaged by the cam 13 as the lay-shaft rotates, and acts through the medium of lever 32, 31 to positively push the piston 24 inwardly toward its shoulder 23. A spring such as 37 acts on the lever 35 to maintain the lever out of engagement with the cam, except at such times as the piston is forced outwardly by air pressures.

The operation of the device is substantially as follows. The valve 20 and piston 24 offer differential pressure areas, so that when compressed air is admitted into the valve casing through the port 27, the air pressures will move piston 24 to its outermost position and into engagement with the hand wheel 25, the piston in this position preventing opening of the valve 20. As the cam 13 acts through the system of levers to positively move the piston 24 inwardly toward the shoulder 23, the valve 20 will be free to open, and will move inwardly to the extent limited by the engagement of the hand wheel 25 with the piston 24. Compressed air will thus be delivered to the combustion space for imparting movement to the power piston therein. As soon as lever 35 is released by the cam 13, the lever train will cease to act on piston 24, and the differential air pressures will again restore said piston to the position shown in the drawing, and effect closing of the valve 20.

It is to be noted that the valve 20 is never positively operated, and that the piston 24 serves merely as a pilot member, to predetermine the times at which the valve is free to move inwardly under air pressures.

I have shown a restoring spring 28 for the valve, but this spring is not important unless the valve be used in inverted position.

To lock the valve against operation it is merely necessary to screw the hand wheel down on the valve stem, and force the piston against the flange 23, whereby the valve will be absolutely locked. The valve is usually kept in such locked condition, and the hand wheel retracted only at times when the starting valve is to be used.

The non-positive operation of the valve 20 prevents opening thereof at any time when the pressure in the combustion space of the cylinder exceeds the pressure in the valve casing, and due to this circumstance there is absolutely no danger of back pressure in the air line. With engines of the Diesel or cold starting type, simply turning off the air supply will render the valve inactive, inasmuch as pressures in the cylinder will always exceed atmospheric pressure, and the valve will be automatically held on its seat. When the compressed air supply is cut off, the piston 24 will move inwardly on the next rotation of the lay-shaft, and will remain in this position, inasmuch as pressures on both sides thereof will be equal. The valve however, due to differential pressures on opposite sides thereof will be held snugly on its seat.

While the embodiment of the invention illustrated is a preferred one, it will be evident that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim—

1. An air starting valve for internal combustion engines including a valve casing adapted to be mounted in the cylinder head of an engine, a valve member formed with a stem slidable in the casing, a piston encircling and sliding freely on the stem, a stationary stop in the casing and an adjustable stop on the stem for limiting the free sliding movement of the piston, means for admitting air into the casing between the piston and valve, said piston and valve having differential pressure areas, whereby the piston normally moves outwardly against the adjustable stop and maintains the valve closed when compressed air is admitted to the casing, means acting intermittently on the piston to positively slide the same inwardly toward the valve and permit the valve to open under air pressure, said adjustable stop being capable of inward movement on the stem to lock the piston against the stationary stop and prevent movement of the valve.

2. The combination with an internal combustion engine of a cylindrical valve casing secured in the wall of a cylinder of said engine, said casing having an inlet port intermediate its ends for the admission of compressed air, a valve seating on the inner end of the casing, and including a stem extending through the casing, a stop shoulder in the casing, a locking member screw threadedly adjustable on the outer end of the stem, a piston mounted on the valve stem for free sliding movement in the outer end of the casing between the locking member and the stop shoulder, said piston and valve having differential pressure areas whereby the piston normally maintains the valve closed when compressed air is admitted to the casing, and means acting intermittently on the piston to positively slide the same toward the valve and permit the valve to open under air pressure.

3. The combination with an internal combustion engine of a cylindrical valve casing secured in the wall of a cylinder of said engine, said casing having an inlet port intermediate its ends for the admission of compressed air, a valve seating on the inner end of the casing, and including a stem extending through the casing, a locking member screw-threadedly adjustable on the outer end of the stem, an annular stop shoulder in the casing, a piston mounted on the valve stem for free sliding movement in the outer end of the casing between the locking member and the annular stop shoulder, said piston and valve having differential pressure areas whereby when air is admitted to the casing, the piston is normally moved to its outermost position against the locking member to hold the valve against opening.

4. The combination with an internal combustion engine of a cylindrical valve casing secured in the wall of a cylinder of said engine, said casing having an inlet port intermediate its ends for the admission of compressed air, a valve seating on the inner end of the casing, and including a stem extending through the casing, an annular stop shoulder in the casing, a locking member screw-threadedly adjustable on the outer end of the stem, a piston mounted on the valve stem for free sliding movement in the outer end of the casing between the locking member and the annular stop shoulder, said piston and valve having differential pressure areas whereby when air is admitted to the casing, the piston is normally moved to its outermost position against the locking member to hold the valve against opening, means engageable with the piston for forcing the same inwardly toward its stop shoulder to permit the valve to open under air pressure.

5. A device of the class described in claim 4, wherein the locking member comprises a hand wheel which may be screwed inwardly on the stem to lock the piston against the shoulder and the valve on its seat.

6. A device of the class described in claim 4, wherein the engine includes a lay shaft, and a cam on the lay shaft, and a lever train controlled by said cam constitutes the means for positively moving the piston.

7. A device of the class described in claim 2, wherein a spring encircling the valve stem normally tends to seat the valve.

DWIGHT O. BARRETT.